United States Patent
Richards

(10) Patent No.: US 10,891,749 B2
(45) Date of Patent: Jan. 12, 2021

(54) DEPTH MAPPING

(71) Applicant: Cambridge Mechatronics Limited, Cambridge (GB)

(72) Inventor: David Charles William Richards, Cambridge (GB)

(73) Assignee: Cambridge Mechatronics Limited, Cambridge (GB)

(*) Notice: Subject to any disclaimer, the term of this patent is extended or adjusted under 35 U.S.C. 154(b) by 0 days.

(21) Appl. No.: 16/348,207

(22) PCT Filed: Nov. 24, 2017

(86) PCT No.: PCT/GB2017/053537
§ 371 (c)(1),
(2) Date: May 8, 2019

(87) PCT Pub. No.: WO2018/096347
PCT Pub. Date: May 31, 2018

(65) Prior Publication Data
US 2019/0325596 A1      Oct. 24, 2019

(30) Foreign Application Priority Data
Nov. 24, 2016 (GB) .................................. 1619921.8

(51) Int. Cl.
*G01S 17/89* (2020.01)
*G06T 7/557* (2017.01)
(Continued)

(52) U.S. Cl.
CPC .............. *G06T 7/557* (2017.01); *G01S 17/46* (2013.01); *G01S 17/89* (2013.01); *G06F 9/3877* (2013.01); *G06T 7/521* (2017.01)

(58) Field of Classification Search
CPC ............. G01B 11/2441; G03H 1/0443; G03H 2001/0452; G01S 17/88; G01S 17/89
See application file for complete search history.

(56) References Cited

U.S. PATENT DOCUMENTS

2008/0001850 A1*  1/2008  Champion ........... G02B 26/101
                                                              345/7
2008/0212154 A1   9/2008  Feinsod et al.
2016/0182887 A1*  6/2016  Gutierrez ................ G06T 7/593
                                                              348/46

FOREIGN PATENT DOCUMENTS

DE    202012105023     3/2013
WO    WO2013175197    11/2013

OTHER PUBLICATIONS

International Search Report and Written Opinion for International Application No. PCT/GB2017/053537, dated Feb. 26, 2018, 12 pages.

* cited by examiner

*Primary Examiner* — Jonathan M Hansen
(74) *Attorney, Agent, or Firm* — Hartman Global IP Law; Gary M. Hartman; Domenica N. S. Hartman

(57) ABSTRACT

A device for depth mapping of an object comprises an emitter comprising a laser and an optical component, an actuator and a control processor unit. The actuator is arranged to change the relative position and/or relative orientation of the optical component to the laser. The control processor unit is configured to receive information relating to change in the location and/or orientation of the device during use of the device, and to instruct the actuator to change the relative position and/or relative orientation of the optical component to the laser so as to compensate for change in the location and/or orientation of the device during use of the device.

15 Claims, 4 Drawing Sheets

Figure 1:
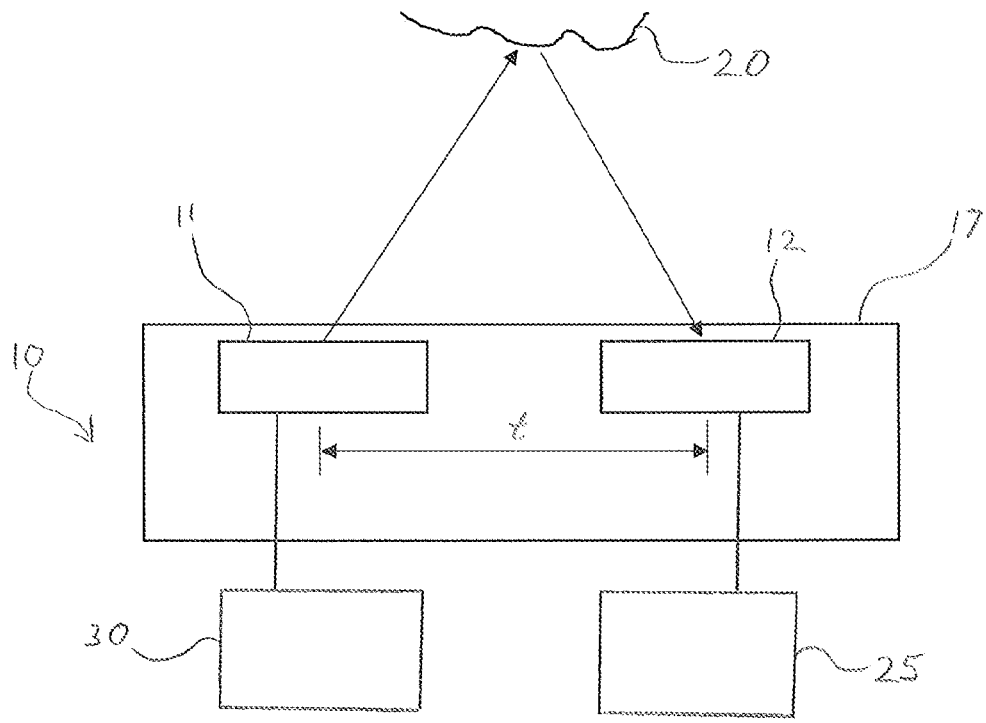

(51) Int. Cl.
*G06T 7/521* (2017.01)
*G01S 17/46* (2006.01)
*G06F 9/38* (2018.01)

DEPTH MAPPING

The invention relates to a device for depth mapping of an object. More particularly, the present invention offers an improved device to reduce the effect of a user's hand shaking on the accuracy of the depth map.

There are many different methods that are being developed and used to create depth maps or establish distance information of surrounding objects. Many of these methods (such as time of flight methods or looking at the distortion of a projected light pattern) involve emitting a light pattern, typically in infrared (IR) wavelengths, and then detecting it, processing either the location of light spots or time between transmission and reception to deduce the distance of the reflecting object. The present invention relates mainly to structured light projectors (systems which project patterned light, typically an array of dots), but can equally be applied to other types of light projectors.

These systems can suffer from a number of drawbacks. One problem is that the strength of IR illumination can be quite weak in comparison to ambient illumination (especially in direct sunlight), meaning that multiple measurements may need to be taken to improve the accuracy of the measurement. Additionally, structured light (dot pattern) projectors need to limit the resolution (amount of detail) contained within the light pattern in order to unambiguously interpret the distortion of the emitted light pattern. For structured light, there is also a trade-off between the quality of depth information and the distance between the emitter and receiver in the device—wider spacing tends to give a better depth map but is more difficult to package, especially in a mobile device.

In many applications, particularly in hand-held or wearable electronic devices for example, the device measuring the depth map may change orientation with time with respect to the surroundings that are being measured. This means that depth information may be distorted during capture and may change significantly between captures. These effects can seriously impact the quality of the deduced depth map. However, shake of the detector caused by a user's hand shaking is known to improve resolution (since the shake applies a dither of fortuitously appropriate magnitude), such that some movement has been considered advantageous.

Meanwhile, in order to improve the quality of the deduced depth map, alignment of the light emitter to the detector is considered exceptionally important. Hence, anything that interferes with the baseline distance between the emitter and the detector has been considered to be disadvantageous.

It is desirable to improve the quality of depth mapping.

According to an aspect of the present invention, there is provided a device for depth mapping of an object, the device comprising: a laser; an optical component; an actuator arranged to change the relative position and/or relative orientation of the optical component to the laser; and a control processor unit configured to: receive information relating to change in the location and/or orientation of the device during use of the device; and instruct the actuator to change the relative position and/or relative orientation of the optical component to the laser so as to compensate for change in the location and/or orientation of the device during use of the device.

In the present invention the change in the location and/or orientation of the device during use of the device is compensated for by the actuator changing the relative position and/or relative orientation of the optical component to the laser. This improves the accuracy of the depth map generated using the device.

This improvement is unexpected because the improvement is provided in spite of the fact that the actuator can interfere with the baseline distance between emitter and the detector. Furthermore, the improvement is unexpected because shaking of the device is expected to improve the receive side, so it is surprising that stabilising the emitter side is useful.

In a first aspect there is provided a device that is used to measure the distance of objects that contains a laser, an optical component and an actuator arranged to change the relative position or orientation of the laser and optical component.

In a second aspect the optical component is a lens.

In a third aspect the optical component is a mirror.

In a fourth aspect the device also includes a gyroscope to measure changes in the orientation of the device.

In a fifth aspect the actuator is an SMA actuator.

Figure 2:
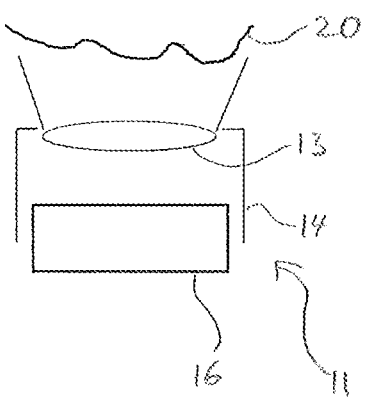
Figure 3:
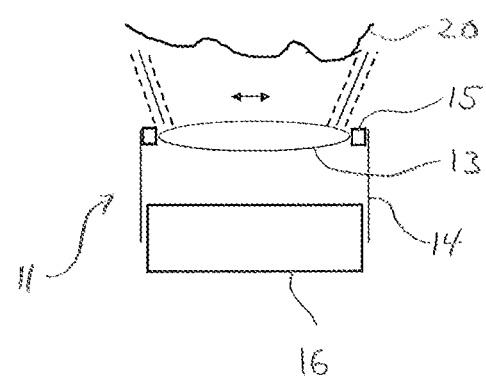
Figure 4:
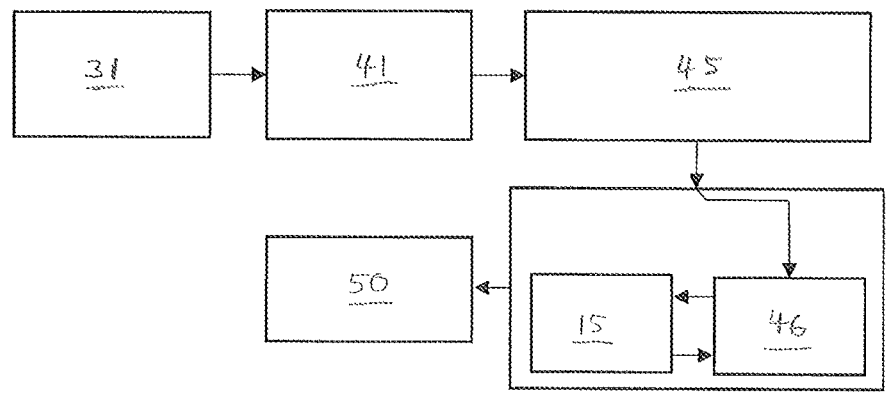
Figure 5:
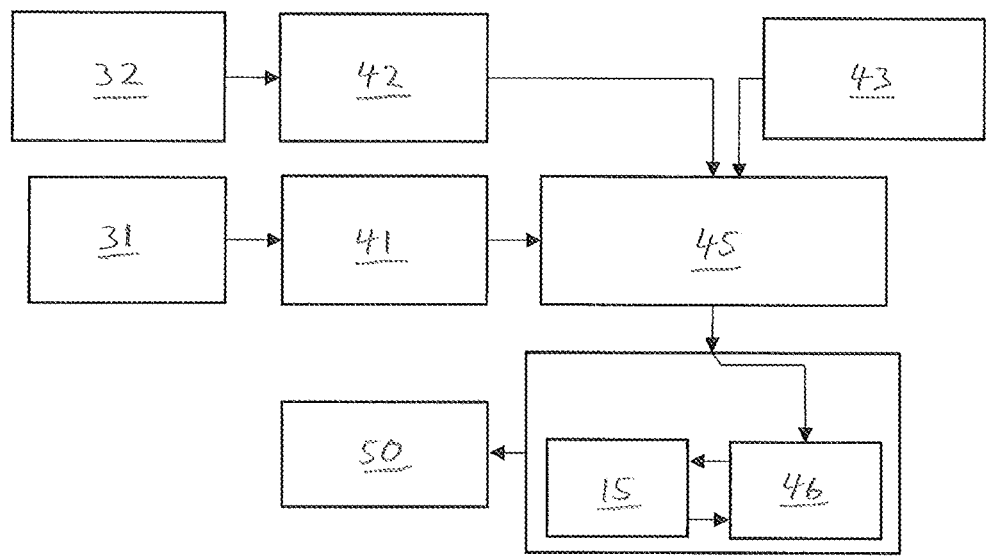
Figure 6:
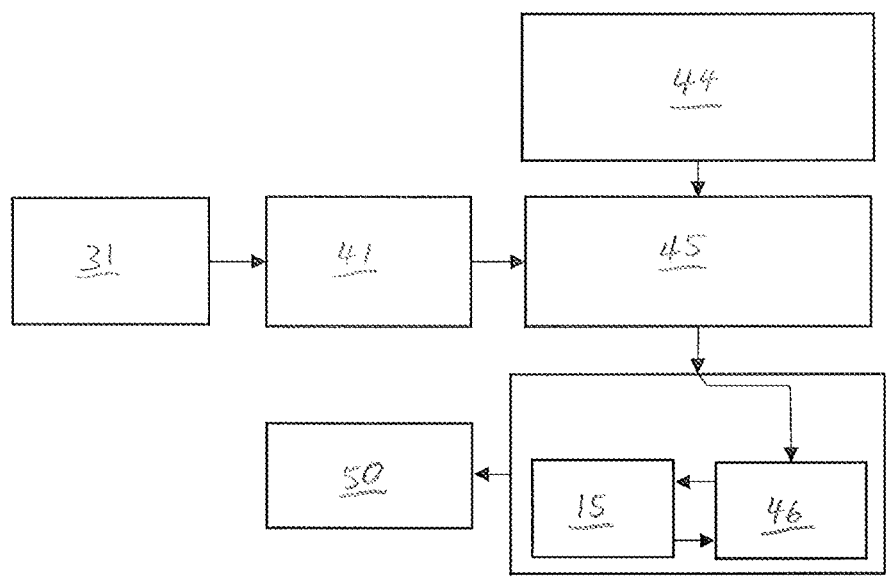
Figure 7:
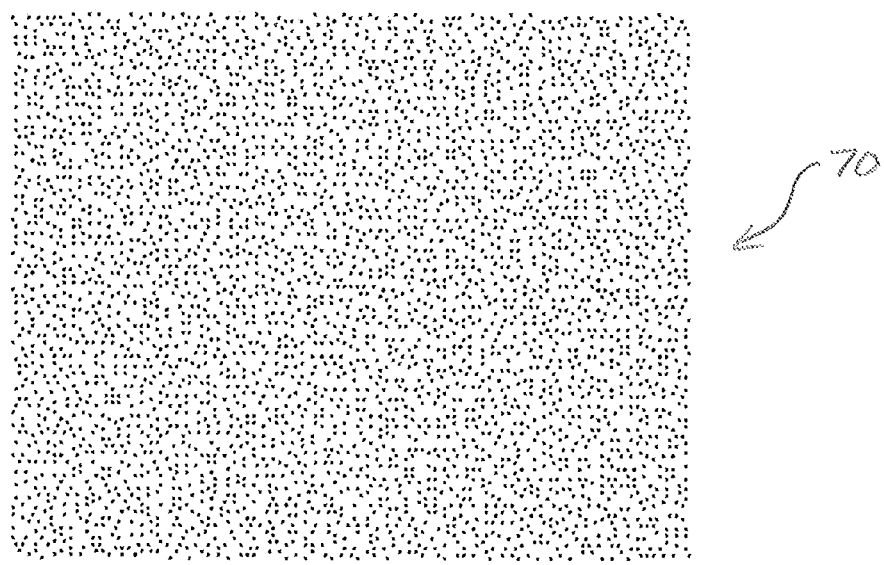
Figure 8:
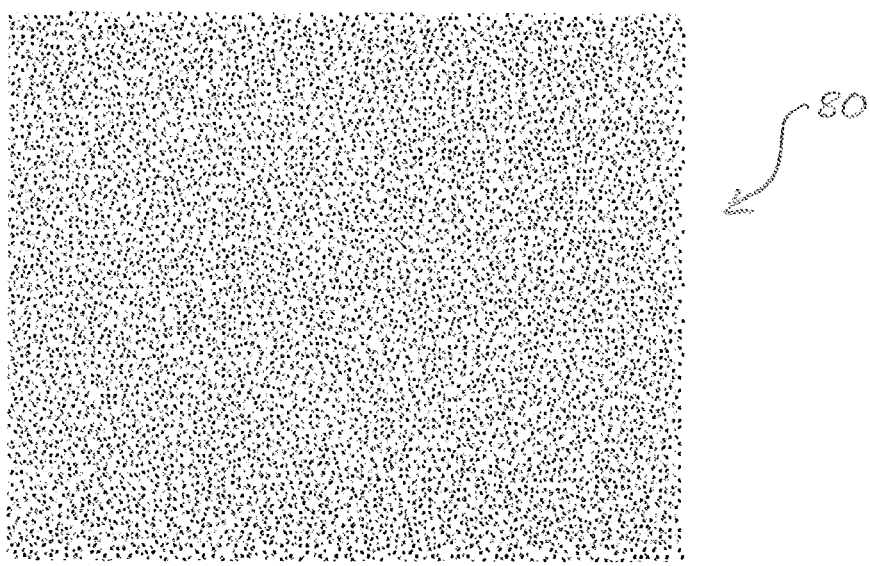

To allow better understanding, and embodiment of the present invention will now be described by way of non-limitative example with reference to the accompanying drawings, in which:

FIG. 1 schematically depicts a device according to an embodiment of the invention;

FIG. 2 schematically depicts a previously known device;

FIG. 3 schematically depicts an emitter of the device according to an embodiment of the invention;

FIGS. 4 to 6 schematically depict functions of the control processor unit of the device according to embodiments of the invention;

FIG. 7 depicts an exemplary pattern of light that may be used in the context of an embodiment of the invention; and FIG. 8 depicts a resolution enhanced pattern of light following implementation of a movement schedule according to an embodiment of the invention.

There will now be described a device in different configurations. The device is the same in each configuration, except for the differences set out below. Accordingly, common elements are given common reference numerals. Except for the differences explicitly set out, the description of common elements applies equally to each of the configurations of the device, but for brevity will not be repeated.

FIG. 1 schematically depicts a device 10 according to an embodiment of the invention. FIG. 1 illustrates the broad scheme of an active depth-sensing device 10 according to an embodiment of the invention. The device 10 is for measuring the distance of objects. The device 10 is a depth-measuring device. The device 10 is for generating a depth map of an object 20.

As shown in FIG. 1, in an embodiment the device 10 comprises an emitter 11 and a detector 12. The emitter 11 is configured to emit radiation to the object 20. The detector 12 is configured to detect the radiation reflected from the object 20. Optionally, the emitter 11 is configured to emit structured radiation (i.e. a light pattern) to the object 20. FIG. 7 depicts an example of a light pattern 70 formed of a plurality of dots (i.e. points of light) that may be used in the context of the present invention. Alternatively, the emitter 11 may be configured to emit a single point of light. Optionally, the radiation is infrared radiation. The light pattern is transmitted to the object and extends across an area of the object, which area may have varying depths, as for example when the object is a human face and the depth mapping device is used for face recognition.

The detector 12 is configured to detect radiation received from the object 20. When a light pattern is used, the measurements of the detector 12 are used to determine distortion of the projected light pattern such that a depth map of the object 20 can be generated. Alternatively, the time of flight of reflected radiation may be calculated for different portions of the object 20 such that the depth map can be generated.

The device 10 includes a depth mapping processor unit 25 that is supplied with the output of the detector 12 and which processes that output to generate a depth map of the object. The depth mapping processor unit 25 may perform this processing using known techniques. The depth mapping processor unit 25 may be implemented in a processor executing appropriate software.

FIG. 2 schematically depicts a previously known emitter 11 which is not in accordance with the present invention. As depicted in FIG. 2, the previously known emitter 11 comprises a bracket 14 that connects the optical component 13 to the laser 16. The bracket 14 rigidly mounts the optical component 13 relative to the laser 16. The optical component 13 cannot move relative to the laser 16. The effects of the hand of the user shaking during use cannot be compensated for.

FIG. 3 schematically depicts an emitter 11 of the device 10 according to an embodiment of the invention which is modified as compared to the emitter 11 shown in FIG. 2. As depicted in FIG. 3, the emitter 11 comprises a laser 16. The laser 16 is the radiation source for the emitter 11. The laser 16 may be a single laser or a laser array. Optionally a beam splitter is provided to split the beam from a single laser into a plurality of beams.

As shown in FIG. 3, the emitter 11 comprises an optical component 13. The optical component 13 is divergent. In the embodiment shown in FIG. 3, the optical component 13 is shown as a lens. Optionally, the optical component 13 is a lens stack comprising a plurality of lenses. In an alternative embodiment, the optical component 13 comprises a mirror. The optical component 13 is configured to receive radiation from the laser 16 and transmit the radiation to the object 20. The optical component 13 affects where on the object 20 the radiation is transmitted. In particular, the relative positions between the laser 16 and the optical component 13 affect the position of the radiation on the object 20. Typically the optical component acts as a beam spreader, increasing the area of the transmitted light pattern.

As depicted in FIG. 3, the emitter 11 further comprises an actuator 15. The actuator 15 is arranged to change the relative position and/or relative orientation of the optical component 13 to the laser 16. Hence, the actuator 15 can affect the position of the emitted radiation on the object 20. The actuator 15 is controllable so as to control the position of the radiation on the object 20.

In an embodiment the device 10 additionally comprises a control processor unit 30. The control processor unit 30 may be implemented in a processor executing appropriate software, which may be same processor of a different processor from that which implements the depth mapping processor unit 25.

The control processor unit 30 is configured to receive information relating to change in the location and/or orientation of the device 10 during use of the device 10. In particular, the location and/or orientation of the device 10 relative to the object 20 may change during a depth measurement operation. For example, in an embodiment the device 10 is comprised in a handheld device such as a mobile phone. When the device 10 is being used to generate a depth map of the object 20, the location and/or orientation of the device 10 may change if the hand of the user shakes.

The handheld device may comprise at least one sensor configured to measure and send to the control processor unit 30 the information relating to the change in the location and/or orientation of the depth mapping device 10 during use of the device 10. For example, the handheld device may comprise an inertial measurement unit (IMU) comprising one or more accelerometers and one or more gyroscopes. The at least one sensor may not be included in the device 10 itself, but may be included elsewhere in the same handheld device that comprises the depth mapping device 10. Alternatively, the at least one sensor may be comprised within the device 10 itself.

The control processor unit 30 is configured to instruct the actuator 15 to change the relative position and/or relative orientation of the optical component 13 to the laser 16 so as to compensate for change in the location and/or orientation of the device 10 during use of the device 10. In particular, the control processor unit 30 is configured to instruct the actuator 15 so as to reduce the extent to which change in the location and/or orientation of the device 10 affects the position of the radiation on the object 20. An embodiment of the invention is expected to improve the accuracy of the depth map for the object 20.

In an embodiment, the control processor unit 30 is configured to instruct the actuator 15 to change the relative position and/or relative orientation of the optical component 13 to the laser 16 so as to stabilise the position of the pattern 70 of structured radiation on the object 20. Optionally, the control processor unit 30 is configured to control an intentional target movement of the pattern of radiation on the object 20 (e.g. to improve resolution). The control processor unit 30 may be configured to instruct the actuator 15 to change the relative position and/or relative orientation of the optical component 13 to the laser 16 so as to control the position of the pattern 70 of structured radiation on the object 20 to match the target movement of the pattern of radiation on the object 20.

In contrast to the device shown in FIG. 2, FIG. 3 shows a bracket 14 that combines with the actuator 15 so as to allow the optical component 13 to move. In particular, the optical component 13 moves primarily in the X-Y plane that is perpendicular to the optical axis of the optical component 13. The actuator comprises one or more SMA wires that extend between a moveable platform, to which the optical component 13 is fixed, and a supporting frame 17, to which the laser 16 is attached.

In an alternative embodiment, the laser 16 may be attached to the moveable platform and the optical component to the supporting frame 17. This is generally a less preferred option because the electrical leads to the laser are necessarily high power and therefore substantial and difficult to move.

The device 10 of the present invention addresses the weaknesses of the previously known depth mapping device. The relative motion between the laser 16 and the optical component 13 allows the direction of the projected pattern to be adjusted.

The device 10 measuring the depth map changes orientation (or position) with time and so the depth map is changing with time causing the accuracy of the data gathered to be reduced.

In the prior art, alignment of the light emitter 11 to the detector 12 is considered exceptionally important, to the point that there is research into post-shipment recalibration techniques, even in systems which are nominally fixed (e.g. Darwish, W.; Tang, S.; Li, W.; Chen, W. *A New Calibration Method for Commercial RGB-D Sensors*. Sensors 2017, 17, 1204. Errors in the relative centre of the emitter and receiver can result in discrepancies in the measured distance. It is easy to show by trigonometry that if there is a baseline distance t (e.g. as shown in FIG. 1 between the emitter and receiver, then an error of δt in the actual versus assumed baseline directly shows as a δt/t error in estimated depth, which can be significant if δt is large (hundreds of microns) and t is small (millimetres). Introducing an X-Y stage into the optical path immediately introduces a source of potential baseline error.

The benefit of reducing motion of a projected dot pattern is quite clear. A typical target voxel size for a near-field depth-mapping solution is less than 1 mm$^3$ (e.g. in the commercially available *Primesense Carmine* 1.09). The typical motion of a hand-held emitter in a mobile device can be around ±1° in rotation and ±1 mm in translation. It can be seen that, without compensation, the dot pattern could translate by up to ±10 mm on the surface of the target object at a range of 60 cm. It can be seen that this is an unacceptably large movement for deducing depth information with 1 mm$^3$ voxels.

The problem is compounded by the fact that the basic optical resolution is often larger than the target voxel size. For example, the Carmine product has a field of view of 54×45° with a VGA resolution depth sensor. To first order, this means that a pixel subtends around 0.1° of arc. This is congruent with the claimed 1 mm resolution in X-Y space (the plane parallel to the emitter/imager plane). Given that the separation of the imager and emitter is about 83 mm, it is possible to calculate the Z movement (distance from the target to the plane containing the imager and emitter) which is required to move the dot by one pixel. By simple trigonometry, it can be seen that the ability to resolve in Z is greater than 1.3 mm. To get to the desired resolution, it is necessary to oversample the target (i.e. record the emitted pattern more than once). Keeping the emitted pattern stationary whilst the target is measured more than once is crucial for getting an accurate measurement. In this example, the exposure time needed to achieve the desired resolution is about one third of a second. The typical frequency of handshake is about 7 Hz, indicating that there may be 2-3 excursions within the exposure time. The excursion may be up to 2 cm, a distance comparable with facial features, such as the bridge of the nose for example. This will clearly affect the depth measurements.

The necessary processing to reduce the motion of the projected dot pattern on the target is very similar to that required for Optical Image Stabilisation, but in reverse. Optical Image Stabilisation techniques are well-known and are described in numerous places (e.g. in Optical Image Stabilization (OIS)—White Paper produced by STMicroelectronics—http://www.st.com/content/ccc/resource/technical/document/whitepaper/c9/a6/fd/e4/e6/4e/48/60/ois_white_paper.pdf/files/ois_white_paper.pdf/jcr:content/translations/en.ois_white_paper.pdf).

Motion of the projecting device 10 needs to be measured and compensation applied to the optical element to ensure that motion of projected light on the target is minimised. Movement is typically measured using gyroscopes (as rotation is the biggest contributor to displacement of the dot pattern), but can be augmented with other sensors such as accelerometers or other pose measurement techniques. Once the posture of the emitter has been determined, it is possible to determine a compensation to apply to the optical element. For best compensation, the algorithm may need to take depth input (either from the deduced depth map or other elements, such as an autofocus actuator in the system).

The actuator 15 may be a shape memory alloy (SMA) actuator. Such actuators can be precisely controlled and have the advantage of compactness, efficiency and accuracy. The ability to precisely control the X-Y position of the actuator is advantageous in light of the potentially high sensitivity to the baseline distance. The actuator 15 may be such as that published in PCT Application Publication number WO 2013/175197, which discloses an actuator for Optical Image Stabilization (OIS) using a four-wire SMA actuator. Mechanisms for high-precision control of such actuators have been covered in several previous disclosures dating back to WO 2008/099156.

FIGS. 4 to 6 schematically depict functions of the control processor unit 30 of the device 10 according to an embodiment of the invention. The functions of the control processor unit 30 are represented by boxes numbered 41 to 46.

FIG. 4 shows a processing chain for a gyroscope-only compensation. As depicted in FIG. 4, a gyroscope 31 sends angular velocity information to the control processor unit 30. The control processor unit 30 comprises an integrator 41 configured to translate the angular velocity into a measurement of the amount by which the orientation (in any of three degrees of freedom) of the device 10 has changed during the depth measurement process. The integrator 41 outputs the result to an optomechanical model 45. The optomechanical model 45 is configured to translate the result from the integrator 41 into a required compensation movement. The optomechanical model 45 is configured to output its result to a controller 46 of an actuator servo 15, 46. The controller 46 is configured to control the actuator 15 to perform the required compensation movement determined by the optomechanical model 45. The actuator servo 15, 46 results in an optical movement 50 that compensates for hand shake of the user.

The actuator servo 15, 46 is shown as having internal feedback. This is advantageous for achieving high-precision with low-cost actuators, however, it could be in the form of position sensors or direct resistance feedback from an SMA actuator system. FIG. 5 shows an example of a processing chain including translation compensation (four-axis compensation). As depicted in FIG. 5, in addition to information from a gyroscope 31, further information from an accelerometer 32 may be used. The accelerometer 32 senses acceleration so as to determine a change in location of the device 10 in any of three degrees of freedom. Hence, the combination of the accelerometer and the gyroscope allow the location and orientation of the device 10 to be determined in six degrees of freedom. The accelerometer 32 outputs it acceleration results to a double integrator 42. The double integrator 42 is configured to translate the sensed acceleration into a change in location of the device 10. The double integrator outputs its result to the optomechanical model 45.

As depicted in FIG. 5, optionally a depth estimator 43 outputs to the optomechanical model 45 a depth estimate. The depth estimate may be determined by the device 10 (which is a depth sensor) or from another source. The optomechanical model 45 is configured to determine the required compensation movement from the change in location and orientation of the device 10.

FIG. 6 shows the injection of a resolution enhancement schedule. As a further aspect to the current invention, given that an actuator 15 has been added to give the function of moving the projected pattern 70 relative to the emitter, it can also be used to intentionally shift the dot pattern 70 over the surface of the target object 20. This, to some extent, counteracts the resolution limitation that was identified in the background discussion. The movement pattern is overlaid on the OIS signal to ensure that the target 20 is genuinely being scanned in the desired pattern.

In particular, as depicted in FIG. 6, in an embodiment the control processor unit 30 comprises a resolution enhancement movement scheduler 44. The resolution enhancement movement scheduler 44 is configured to determine a sequence of X-Y positions with respect to time for the pattern of radiation on the object 20. For example, the resolution enhancement movement scheduler 44 may determine that the pattern of light should be periodically shifted so that the dots in the pattern of light are incident on different points on the object 20. This can help to effectively increase the resolution of the pattern of the light. FIG. 7 shows and example of a typical dot pattern and FIG. 8 schematically depicts a resolution enhanced pattern of light following such a movement schedule.

This description is concentrated on the emitter equipment. Given that Optical Image Stabilisation has been mentioned, it seems right to consider its utility on the receive side. In a possibly unexpected result, OIS is not as critical on the receive side of system. The reason for this is that the receiver resolution is typically larger than the target voxel size. It is well-known that when the quantisation of the signal is comparable to or larger than the smallest relevant step of a quantity to be measured, small amounts of dither (randomised noise) can practically improve the resolution rather than diminish it. By luck, for current products, handshake tends to introduce random movement of about the scale of ±1 pixel on the detector. This is a good level for dither to occur at. Indeed, random dither of amplitude ±1 LSB (where LSB stands for 'Least Significant Bit'—i.e. the smallest representable unit in the sampled system) with triangle probability distribution is a known optimal result for breaking up quantisation distortion of measurements. Hence allowing handshake through on the receive side only is potentially advantageous. It is important to note the asymmetry of the argument here—stabilising the emitted light still provides an advantage—allowing the points to move on the object being sampled degrades the depth map. It is anticipated that, as pressure to improve the quality of depth information increases, handshake will become substantially larger than 1-pixel amplitude in receive space, so conventional Image Stabilisation techniques will become important for the receiver side.

To extract information from the movement of the dot pattern, the depth-map control processor unit 30 needs to be aware of the movement which has been achieved at each sampled timestep.

It should be noted that, due to the typical pseudo-random nature of the dot patterns used, there are typically no particularly good or bad directions to move the projected pattern in—the improvement in sampling behaviour is quite uniformly good once the movement increases to about half of the mean inter-dot distance.

The description above has related to systems with a single emitter and single receiver. The invention applies equally to systems with one emitter and multiple receivers (as are implemented in, for example, Realsense cameras), or indeed to sysemts with multiple emitters and receivers.

The invention claimed is:

1. A device for depth mapping of an object, the device comprising:
   an emitter comprising a laser for emitting radiation and an optical component for transmitting the radiation to the object and from which reflected radiation is reflected from a surface of the object for measuring a distance of the device relative to the object and generating a depth map of the object;
   a depth mapping processor unit that executes software to generate the depth map from the reflected radiation;
   a shape memory alloy (SMA) actuator arranged to change the relative position and/or relative orientation of the optical component to the laser to control a position of the radiation on the object; and
   a control processor unit that executes software to:
      receive information relating to change in the location and/or orientation of the device relative to the object during use of the device; and
      instruct the SMA actuator to change the relative position and/or relative orientation of the optical component to the laser so as to compensate for and reduce the extent to which a change in the location and/or orientation of the device relative to the object during use of the device affects measurement of the distance of the device relative to the object, the position of the radiation on the object, and the depth map of the object generated by the depth mapping processor unit from the reflected radiation.

2. The device of claim 1, comprising:
   at least one sensor configured to measure and send to the control processor unit the information relating to the change in the location and/or orientation of the device during use of the device.

3. The device of claim 2, wherein the at least one sensor comprises at least one gyroscope configured to measure the change in the orientation of the device and/or at least one accelerometer configured to measure the change in the location of the device.

4. The device of claim 1, wherein the SMA actuator comprises a shape memory alloy (SMA) wire.

5. The device of claim 1, wherein said information relates to the location and/or orientation of the device in at least three degrees of freedom.

6. The device of claim 1, wherein said information relates to the location and/or orientation of the device in six degrees of freedom.

7. The device of claim 1, wherein the optical component is a lens.

8. The device of claim 1, wherein the optical component is a mirror.

9. The device of claim 1, further comprising a supporting frame, the laser being fixed to the supporting frame and the SMA actuator being arranged to change the relative position and/or relative orientation of the optical component with respect to the supporting frame and the laser.

10. The device of claim 9, further comprising a detector that is configured to detect the reflected radiation reflected from an object, wherein the detector is fixed to the supporting frame.

11. The device of claim 1, further comprising a detector that is configured to detect the reflected radiation reflected from an object.

12. The device of claim 11, wherein the software executed by the depth mapping processor unit processes the output of the detector to generate the depth map.

13. The device of claim 1, wherein the emitter is configured to emit a pattern of structured radiation onto the object.

14. The device of claim 13, wherein the control processor unit is configured to instruct the SMA actuator to change the relative position and/or relative orientation of the optical component to the laser so as to stabilise the position of the pattern of structured radiation on the object.

15. A mobile phone comprising the device of claim 1.

* * * * *